(12) United States Patent
Lee

(10) Patent No.: US 10,466,795 B2
(45) Date of Patent: Nov. 5, 2019

(54) MOBILE INPUT DEVICE AND COMMAND INPUT METHOD USING THE SAME

(71) Applicant: LG ELECTRONICS INC., Seoul (KR)

(72) Inventor: Wonhee Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 254 days.

(21) Appl. No.: 14/780,901

(22) PCT Filed: Mar. 29, 2013

(86) PCT No.: PCT/KR2013/002628
§ 371 (c)(1),
(2) Date: Sep. 28, 2015

(87) PCT Pub. No.: WO2014/157757
PCT Pub. Date: Oct. 2, 2014

(65) Prior Publication Data
US 2016/0054805 A1    Feb. 25, 2016

(51) Int. Cl.
*G06F 3/00*    (2006.01)
*G06F 3/01*    (2006.01)
(Continued)

(52) U.S. Cl.
CPC ........... *G06F 3/017* (2013.01); *B25J 11/0005* (2013.01); *B25J 13/003* (2013.01); *G05B 15/02* (2013.01);
(Continued)

(58) Field of Classification Search
None
See application file for complete search history.

(56) References Cited

U.S. PATENT DOCUMENTS

| 2004/0104702 A1* | 6/2004 | Nakadai | B25J 13/00 318/568.12 |
| 2005/0216126 A1* | 9/2005 | Koselka | B25J 5/007 700/259 |

(Continued)

FOREIGN PATENT DOCUMENTS

| KR | 10-2005-0026267 A | 3/2005 |
| KR | 10-2207-0012122 A | 1/2007 |

(Continued)

*Primary Examiner* — Paul B Yanchus, III
(74) *Attorney, Agent, or Firm* — Birch, Stewart, Kolasch & Birch, LLP

(57) ABSTRACT

A mobile input device and a command input method using the same are disclosed. The mobile input device capable of moving using a driving motor includes a command recognition unit configured to recognize at least one of a voice command and a gesture command, a command transmitting unit configured to transmit a command signal corresponding to at least one of the voice command and the gesture command input to the command recognition unit to an external electronic device, a moving unit including the driving motor, and a controller configured to control recognition of at least one of the voice command and the gesture command, transmission of the command signal to the external electronic device, and movement of the mobile input device.

16 Claims, 22 Drawing Sheets

(51) Int. Cl.
  *B25J 13/00* (2006.01)
  *B25J 11/00* (2006.01)
  *G06F 21/32* (2013.01)
  *G05B 15/02* (2006.01)
  *G06F 3/16* (2006.01)
  *G05D 1/00* (2006.01)

(52) U.S. Cl.
  CPC ........... *G05D 1/0016* (2013.01); *G06F 3/011* (2013.01); *G06F 3/167* (2013.01); *G06F 21/32* (2013.01); *G05D 2201/0211* (2013.01)

(56) References Cited

U.S. PATENT DOCUMENTS

| | | | |
|---|---|---|---|
| 2006/0143017 A1* | 6/2006 | Sonoura | G10L 15/26 704/275 |
| 2007/0021867 A1 | 1/2007 | Woo | |
| 2009/0210227 A1* | 8/2009 | Sugiyama | G10L 15/22 704/246 |
| 2010/0174546 A1* | 7/2010 | Kim | B25J 13/003 704/275 |
| 2011/0144993 A1* | 6/2011 | Ruby | G10L 17/26 704/243 |
| 2012/0131065 A1* | 5/2012 | Park | G06F 17/30029 707/805 |
| 2012/0316679 A1 | 12/2012 | Papaefstathiou et al. | |
| 2013/0060379 A1 | 3/2013 | Choe et al. | |
| 2013/0218395 A1* | 8/2013 | Kim | G05D 1/0246 701/23 |
| 2014/0062866 A1* | 3/2014 | Yamashita | G06K 9/4652 345/156 |

FOREIGN PATENT DOCUMENTS

| | | |
|---|---|---|
| KR | 10-2007-0061078 A | 6/2007 |
| KR | 10-2007-0067190 A | 6/2010 |
| KR | 10-2013-0027347 A | 3/2013 |

\* cited by examiner

| Voice command | Function |
|---|---|
| UP | Channel up |
| Down | Channel down |
| Loudly | Volume up |
| Quietly | Volume down |
| Search | Searching |
| Storage | Recording |
| Close | Power off |
| Left shift | Left shift |
| Right shift | Right shift |
| Up shift | Up shift |
| Down shift | Down shift |
| Choice | Choice |
| Deletion | Deletion |
| Menu | Menu Display |

| Type | Call command | Release command |
|---|---|---|
| 1 | LG | GL |
| 2 | Start | End |
| 3 | Go | Stop |

FIG. 15

| Type | Call command | Release command |
|---|---|---|
| Call word | Ah ~ | Ah ~ |
| Frequency | 10Hz ~ 500Hz | 500Hz ~ 20KHz |

FIG. 16

| Type | Call command | Release command |
|---|---|---|
| Call word | Hungry | Hungry |
| Accent | Hungry | Hungry |

| Type | Call command | Release command |
|---|---|---|
| Gesture |  |  |

FIG. 25
| User | Call command | Priority |
|---|---|---|
| Father | LG | 1 |
| Mother | Make money | 2 |
| Son | Hungry | 3 |
| Daughter | Serve meal | 4 |
FIG. 26
| | Father | Mother |
|---|---|---|
| Call command | LG | Make money |
| Voice pattern |  |  |

MOBILE INPUT DEVICE AND COMMAND INPUT METHOD USING THE SAME

TECHNICAL FIELD

The present disclosure relates to a mobile input device and a command input method using the same.

BACKGROUND ART

Electronic devices such as a broadcasting signal receiver may implement a function controlling various functions using a voice and/or a gesture of a user.

In a related art, when a distance between the electronic device and the user increases, recognition sensitivity of the voice and/or the gesture of the user was reduced.

SUMMARY OF INVENTION

Technical Problem

The present disclosure provides a mobile input device and a command input method using the same capable of preventing a reduction in recognition sensitivity of a voice and/or a gesture of a user even when the user is far away from an electronic device.

Technical Solution

In one aspect, there is a mobile input device capable of moving using a driving motor comprising a command recognition unit configured to recognize at least one of a voice command and a gesture command, a command transmitting unit configured to transmit a command signal corresponding to at least one of the voice command and the gesture command input to the command recognition unit to an external electronic device, a moving unit including the driving motor, and a controller configured to control recognition of at least one of the voice command and the gesture command, transmission of the command signal to the external electronic device, and movement of the mobile input device.

When a call command is input, the controller may be configured to control the moving unit and move the mobile input device so that the mobile input device approaches a user or change a direction of the mobile input device so that the mobile input device faces the user. The call command may be at least one of the voice command and the gesture command.

When a distance between the mobile input device and the user is greater than a previously set critical distance, the mobile input device may be configured to approach the user closer than the critical distance when the call command is input.

The mobile input device may be configured to transmit the command signal corresponding to at least one of the voice command and the gesture command, which the user positioned within the critical distance inputs, to the external electronic device.

When the user positioned within the critical distance is in the plural, the mobile input device may be configured to give a control authority to the user corresponding to previously set facial recognition information among the plurality of users.

When the user positioned within the critical distance is in the plural, the mobile input device may be configured to give a control authority to the user inputting a previously set password among the plurality of users.

When the user positioned within the critical distance is in the plural, the mobile input device may be configured to give a control authority to the user, who makes a first response to a call of the mobile input device among the plurality of users.

A response of the user to the call of the mobile input device may be at least one of a voice and a gesture.

The critical distance may be less than a distance between the user and the external electronic device.

When a distance between a user and the external electronic device is greater than a distance between the user and the mobile input device, the mobile input device may be configured to transmit a command signal corresponding to at least one of a voice and a gesture of the user to the external electronic device.

The command signal may be a control signal for controlling the external electronic device.

The command recognition unit may include a voice recognition unit configured to recognize the voice command and a motion recognition unit configured to recognize the gesture command.

In another aspect, there is a command input method using a mobile input device capable of moving using a driving motor, comprising inputting at least one of a voice command and a gesture command to the mobile input device and transmitting a command signal corresponding to at least one of the voice command and the gesture command input to the mobile input device to an external electronic device.

When a call command is input, the mobile input device may be configured to move and approach a user or change a direction so that the mobile input device faces the user.

When a distance between the mobile input device and the user is greater than a previously set critical distance, the mobile input device may be configured to approach the user closer than the critical distance when the call command is input.

The mobile input device may be configured to transmit the command signal corresponding to at least one of the voice command and the gesture command, which the user positioned within the critical distance inputs, to the external electronic device.

When the user positioned within the critical distance is in the plural, the mobile input device may be configured to give a control authority to the user corresponding to previously set facial recognition information among the plurality of users.

When the user positioned within the critical distance is in the plural, the mobile input device may be configured to give a control authority to the user inputting a previously set password among the plurality of users.

When the user positioned within the critical distance is in the plural, the mobile input device may be configured to give a control authority to the user, who makes a first response to a call of the mobile input device among the plurality of users.

The critical distance may be less than a distance between the user and the external electronic device.

Advantageous Effects

A mobile input device and a command input method using the same according to the present disclosure can transmit a voice command and/or a gesture command of a user to an electronic device even when the user is far away from the electronic device by transmitting the voice command and/or the gesture command to the electronic device using the mobile input device as a medium.

DESCRIPTION OF DRAWINGS

FIGS. 4 to 26 illustrate in detail a method for inputting a command to an electronic device using a mobile input device.

MODE FOR INVENTION

Figure 1:
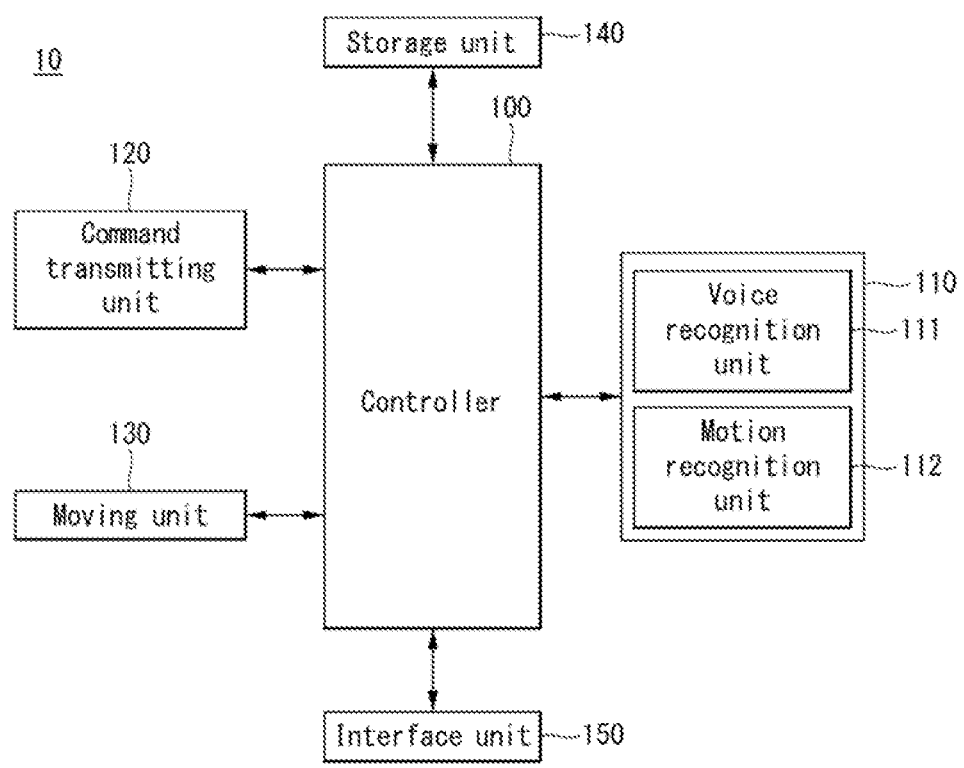
FIGS. 1 to 3 illustrate configuration of a mobile input device according to an exemplary embodiment of the invention.

Reference will now be made in detail embodiments of the invention examples of which are illustrated in the accompanying drawings.

Since the present disclosure may be modified in various ways and may have various forms, specific embodiments are illustrated in the drawings and are described in detail in the present specification. However, it should be understood that the present disclosure is not limited to specific disclosed embodiments, but include all modifications, equivalents and substitutes included within the spirit and technical scope of the present disclosure.

The terms 'first', 'second', etc. may be used to describe various components, but the components are not limited by such terms. The terms are used only for the purpose of distinguishing one component from other components. For example, a first component may be designated as a second component without departing from the scope of the present disclosure. In the same manner, the second component may be designated as the first component.

The term "and/or" encompasses both combinations of the plurality of related items disclosed and any item from among the plurality of related items disclosed.

When an arbitrary component is described as "being connected to" or "being linked to" another component, this should be understood to mean that still another component(s) may exist between them, although the arbitrary component may be directly connected to, or linked to, the second component. On the other hand, when an arbitrary component is described as "being directly connected to" or "being directly linked to" another component, this should be understood to mean that no component exists between them.

The terms used in the present application are used to describe only specific embodiments or examples, and are not intended to limit the present disclosure. A singular expression may include a plural expression as long as it does not have an apparently different meaning in context.

In the present application, the terms "include" and "have" should be understood to be intended to designate that illustrated features, numbers, steps, operations, components, parts or combinations thereof exist and not to preclude the existence of one or more different features, numbers, steps, operations, components, parts or combinations thereof, or the possibility of the addition thereof.

Unless otherwise specified, all of the terms which are used herein, including the technical or scientific terms, have the same meanings as those that are generally understood by a person having ordinary knowledge in the art to which the present disclosure pertains. The terms defined in a generally used dictionary must be understood to have meanings identical to those used in the context of a related art, and are not to be construed to have ideal or excessively formal meanings unless they are obviously specified in the present application.

The following exemplary embodiments of the invention are provided to those skilled in the art in order to describe the present disclosure more completely. Accordingly, shapes and sizes of elements shown in the drawings may be exaggerated for clarity.

Figure 2:
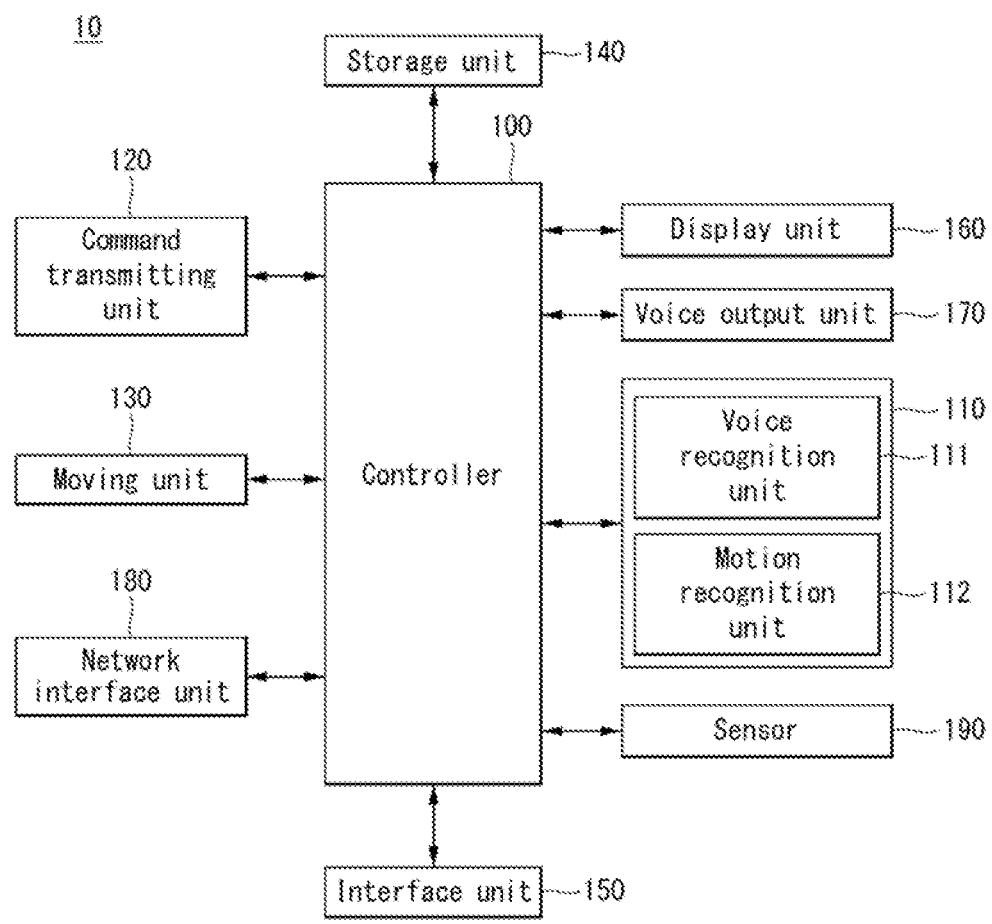
Figure 3:
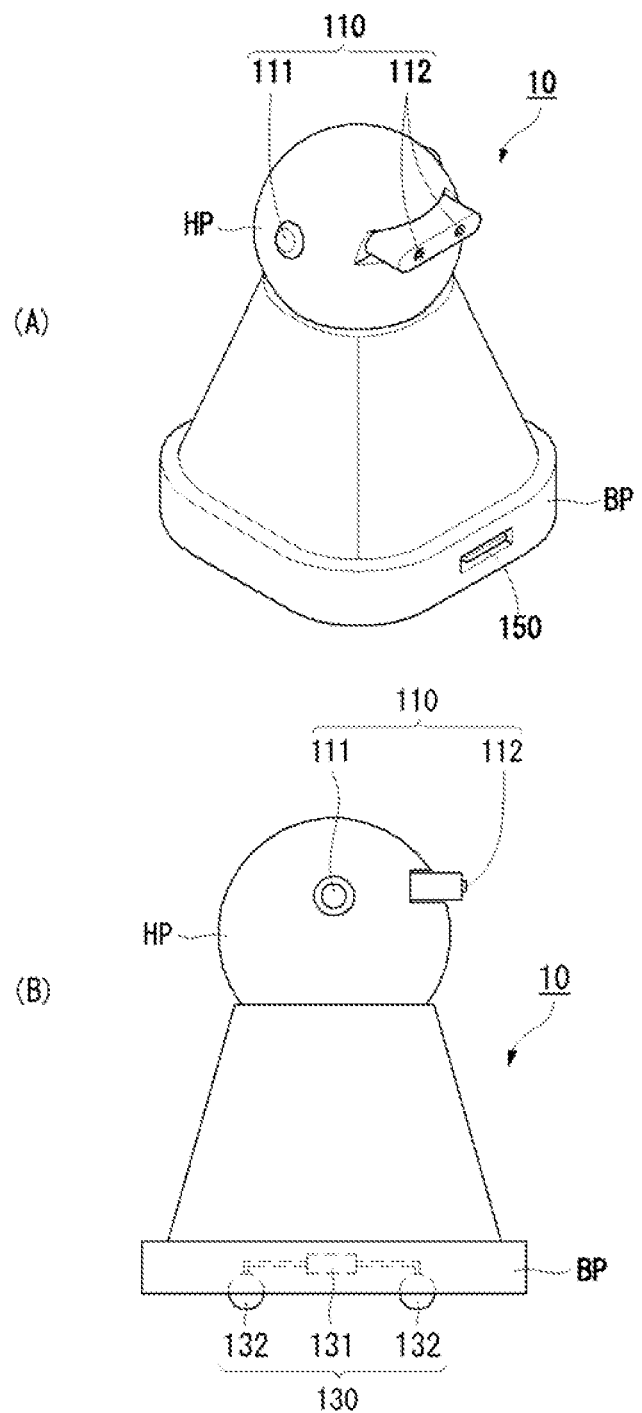

FIGS. 1 to 3 illustrate configuration of a mobile input device according to an exemplary embodiment of the invention.

Referring to FIG. 1, a mobile input device 10 may include a controller 100, a command recognition unit 110, a command transmitting unit 120, a moving unit 130, a storage unit 140, and an interface unit 150.

The moving unit 130 may include a driving motor providing force for a movement of the mobile input device 10. Hence, the mobile input device 10 is movable.

The command transmitting unit 120 may transmit a command signal corresponding to at least one of a voice command and a gesture command input to the command recognition unit 110 to an external electronic device (not shown).

Examples of the external electronic device may include a display device such as a broadcasting signal receiver, a refrigerator, and an air conditioner.

The storage unit 140 may store a program for processing and controlling various signals of the controller 100 or store a processed video, audio, or data signal.

For example, the storage unit 140 may store a program required to drive the mobile input device 10. The storage unit 140 may store map data about a movement range of the mobile input device 10. The storage unit 140 may store information about a driving time of the mobile input device 10. The storage unit 140 may store information about a location of a charger capable of charging the mobile input device 10.

The interface unit 150 may be connected to the charger (not shown) and may receive power from the charger.

The interface unit 150 may electrically connect the mobile input device 10 to the external electronic device. For this, the interface unit 150 may include an A/V input and output unit (not shown) or a wireless communication unit (not shown).

The command recognition unit 110 may recognize at least one of the voice command and the gesture command.

The command recognition unit 110 may include a voice recognition unit 111 recognizing the voice command and a motion recognition unit 112 recognizing the gesture command.

The voice recognition unit 111 may sense various sounds. For example, the voice recognition unit 111 may sense various sounds including a telephone ring sound, a doorbell sound, a sound of water, and a user's voice, etc. For this, the voice recognition unit 111 may include a voice sensor or a microphone.

The motion recognition unit 112 may sense a user's gesture or sense a distance from a user. For his, the motion recognition unit 112 may include at least one of a touch sensor, a sound sensor, a location sensor, or a motion sensor. Further, the motion recognition unit 112 may include a camera.

Information recognized by the command recognition unit 110 may be transmitted to the controller 100.

The controller 100 may recognize the voice command and/or the gesture command using the information received from the command recognition unit 110.

The controller 100 may control the overall operation of the mobile input device 10. For example, the controller 110 may control the recognition of at least one of the voice command and the gesture command, the transmission of the command signal to the external electronic device, and the movement of the mobile input device 10.

The motion recognition unit 112 may also sense such information as the shape of the user's face and a viewing direction of the user's face as well as the user's gesture.

Referring to FIG. 2, the mobile input device 10 according to the embodiment of the invention may further include a display unit 160, a voice output unit 170, a network interface unit 180, and a sensor 190.

The network interface unit 180 may provide an interface for connecting the mobile input device 10 to a wired/wireless network including Internet.

The network interface unit 180 may transmit and receive data to and from another user or another electronic device through a connected network or another network linked to the connected network.

The display unit 160 may display a predetermined image. For example, the display unit 160 may play a contents file (a video file, a still image file, a music file, a document file, an application file, and so on) stored in the storage unit 140 and provide the contents file for the user.

The display unit 160 may include a touch panel and may be used as a predetermined input device.

The voice output unit 170 may output a voice-processed signal to the controller 100.

The sensor 190 may sense a barrier, for example, a wall between the user and the mobile input device 10.

The sensor 190 may sense a barrier on a moving path of the mobile input device 10.

The sensor 190 may also sense dust, trash, water, and so on.

The sensor 190 may provide various sensed information so that the mobile input device 10 can approach the user when the user calls the mobile input device 10.

Although not shown, the mobile input device 10 according to the embodiment of the invention may further include a key pad, a touch panel, etc. capable of inputting a predetermined command.

As shown in FIG. 3, the mobile input device 10 according to the embodiment of the invention may be configured as a robot-shaped device.

Referring to (A) and (B) of FIG. 3, a head portion HP of the mobile input device 10 may include the voice recognition unit 111 and the motion recognition unit 112.

As shown in (B) of FIG. 3, a bottom portion BP of the mobile input device 10 may include the moving unit 130 having a driving wheel 132 driven by a motor 131.

The mobile input device 10 can move through such a configuration.

FIGS. 4 to 26 illustrate in detail a method for inputting a command to an electronic device using the mobile input device. In what follows, those descriptions given above will be omitted.

Figure 4:
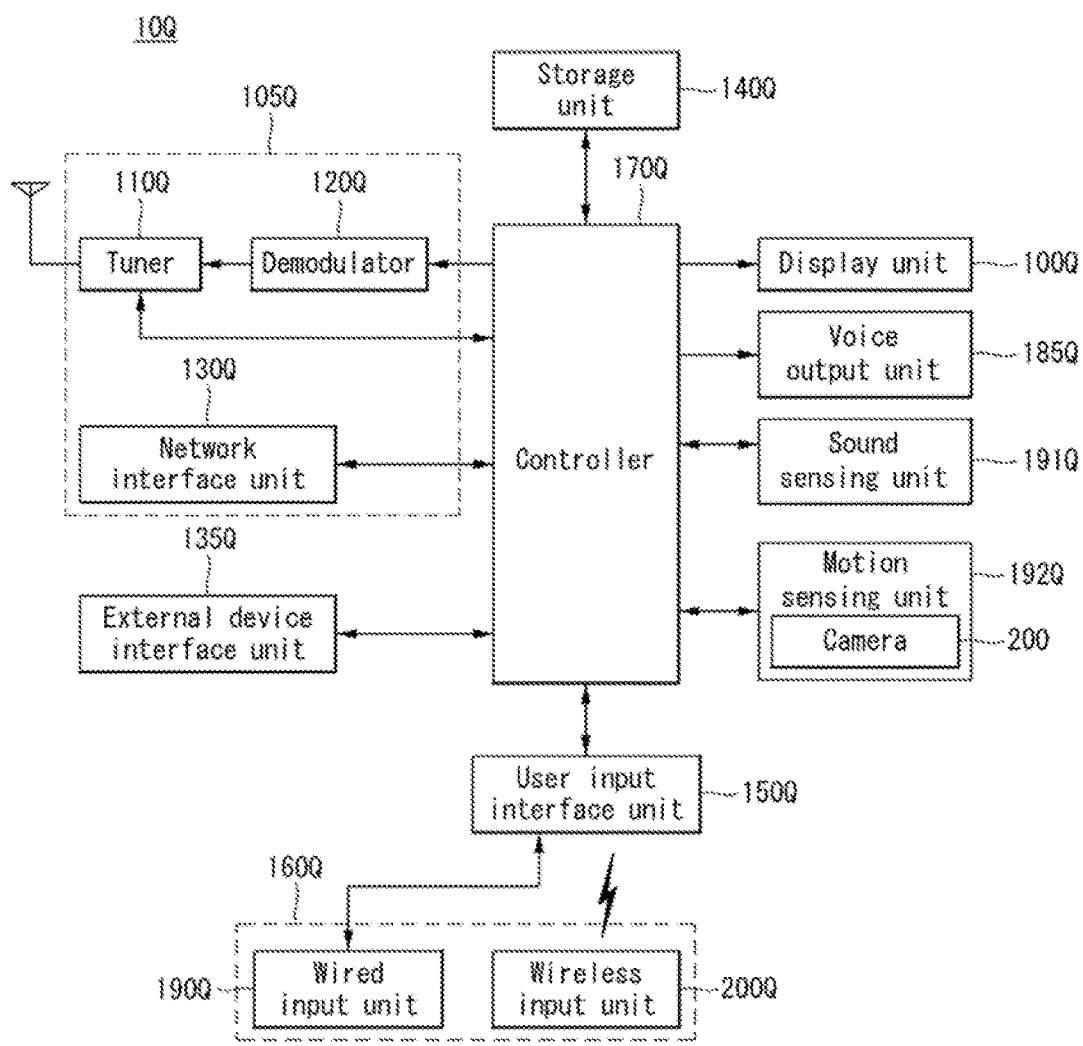

In FIG. 4, a broadcasting signal receiver 10Q is used as an example of the electronic device capable of being controlled using the mobile input device 10 according to the embodiment of the invention. However, the embodiment of the invention is not limited thereto. For example, in addition to the broadcasting signal receiver 10Q as the electronic device capable of being controlled using the mobile input device 10 according to the embodiment of the invention, a refrigerator, an air conditioner, a washing machine, a radio, a door lock, etc. may be used.

Referring to FIG. 4, the broadcasting signal receiver 10Q capable of being controlled using the mobile input device 10 according to the embodiment of the invention may include a display unit 100Q, a receiver 105Q, an external device interface unit 135Q, a storage unit 140Q, a user input interface unit 150Q, a controller 170Q, and a command input unit 160Q.

The display unit 100Q may be regarded as a display panel.

Furthermore, the broadcasting signal receiver 10Q can include a voice output unit 185Q for outputting a voice, a sound sensing unit 191Q for sensing a voice, and a motion sensing unit 192Q for sensing a user's gesture.

The broadcasting signal receiver 10Q according to the embodiment of the invention will be described in more detail below.

The receiver 105Q may include a tuner 110Q, a demodulator 120Q, and a network interface unit 130Q.

The tuner 110Q selects a radio frequency (RF) broadcasting signal corresponding to a channel chosen by the user or RF broadcasting signals corresponding to all of previously stored channels among RF broadcasting signals received through an antenna. The tuner 110Q converts the selected RF broadcasting signal into an intermediate frequency signal, a baseband video signal, or a voice signal.

The demodulator 120Q receives a digital IF signal (DIF) converted by the tuner 110Q and demodulates the received DIF.

The demodulator 120Q may output a stream signal TS after carrying out demodulation and channel decoding. In this instance, the stream signal may be a signal obtained by multiplexing a video signal, a voice signal, or a data signal.

The stream signal output from the demodulator 120Q may be input to the controller 170Q.

The controller 170Q carries out demultiplexing and video/voice signal processing, displays an image on the display unit 100Q, and outputs a voice to the voice output unit 185Q.

The external device interface unit 135Q may connect an external device to the broadcasting signal receiver 10Q. For this, the external device interface unit 135Q may include an A/V input and output unit (not shown) or a wireless communication unit (not shown).

The network interface unit 130Q provides an interface for connecting the broadcasting signal receiver 10Q to a wired/wireless network including the Internet.

The network interface unit 130Q may transmit and receive data to and from another user or another electronic device through a connected network or another network linked to the connected network.

The storage unit 140Q may store a program for processing and controlling various signals of the controller 170Q or store a signal-processed video, audio, or data signal.

The broadcasting signal receiver 10Q may play a contents file (a video file, a still image file, a music file, a document file, an application file, and so on) stored in the storage unit 140Q and provide the contents file for the user.

The command input unit 160Q may include an input key for receiving a user's command. The command input unit 160Q may include a wired input unit 190Q for inputting a command in a wired manner and a wireless input unit 200Q for inputting a command wirelessly.

Through the command input unit 160Q, the user can input various commands such as power on/off, channel selection, screen setting, volume control, movement of a cursor or a pointer on the screen, and menu selection.

In the embodiment disclosed herein, the wireless input unit 200Q may be a remote controller.

The user input interface unit 150Q may transmit a signal the user inputs to the controller 170Q through the command input unit 160Q or transmit a signal from the controller 170Q to the command input unit 160Q.

The controller 170Q may demultiplex streams input through the tuner 110Q, the demodulator 120Q, or the external device interface unit 135Q, or process demultiplexed signals, thereby producing and outputting a video signal or a voice signal.

The video signal processed in the controller 170Q may be input to the display unit 100Q and may be displayed as an image in response to the corresponding video signal. Also, the video signal processed in the controller 170Q may be input to an external output device through the external device interface unit 135Q.

The voice signal processed in the controller 170Q may be output to the voice output unit 185Q. Also, the voice signal processed in the controller 170Q may be input to the external output device through the external device interface unit 135Q.

The controller 170Q may control the overall operation of the broadcasting signal receiver 10Q. For example, the controller 170Q may control the tuner 110Q so that the tuner 110Q tunes an RF broadcasting program corresponding to the channel selected by the user or the previously stored channel.

The controller 170Q may control the broadcasting signal receiver 10Q by using a user command or an internal program received through the user input interface unit 150Q.

The controller 170Q may control the display unit 100Q to display the image.

The controller 170Q may control playing the contents. The contents in this case may correspond to the contents stored in the broadcasting signal receiver 10Q, the received broadcasting contents, or the contents input from the outside. The contents may be at least one of a broadcasting image, an externally input image, an audio file, a still image, a web page accessed, and a document file.

The display unit 100Q converts a video signal, a data signal, and an OSD signal processed by the controller 170Q or a video signal, a data signal, etc. received from the external device interface unit 135Q into the respective R, G, and B signals and generates a driving signal.

The display unit 100Q may employ PDP, LCD, OLED, flexible display, 3D display, and so on.

Meanwhile, the display unit 100Q may be composed of a touch screen, thereby also being used as an input device in addition to being used as an output device.

The voice output unit 185Q receives a voice-processed signal from the controller 170Q, for example, a stereo signal, a 3.1 channel signal, or a 5.1 channel signal and outputs the received voice-processed signal as a voice. The voice output unit 185Q may be implemented as various forms of speakers.

The sound sensing unit 191Q may sense a sound generated inside or outside the broadcasting signal receiver 10Q.

For example, the sound sensing unit 191Q may sense various kinds of sounds generated from the outside of the broadcasting signal receiver 10Q, such as a telephone ring sound, a doorbell sound, a sound of water, and a user's voice. For this, the sound sensing unit 191Q may include a voice sensor or a microphone.

The motion sensing unit 192Q may sense the motion of a user, a distance between a pointing part and the display unit 100Q, or an angle between the pointing part and the display unit 100Q. For this, the motion sensing unit 192Q may include a sensor unit (not shown) equipped with at least one of a touch sensor, a voice sensor, a position sensor, and a motion sensor. A signal sensed by the sensor unit may be transmitted to the controller 170Q.

Alternatively, the motion sensing unit 192Q may include a camera 200. Image information captured by the camera 200 may be input to the controller 170Q.

Alternatively, the motion sensing unit 192Q may include both the sensor unit and the camera 200.

The controller 170Q may sense the user's gesture by separately using an image captured by the camera 200 and a signal sensed by the sensor unit (not shown) or by combining them.

The controller 170Q may move a pointer displayed on the display unit 100Q, select an object displayed on the display unit 100Q, or perform a predetermined function depending on a motion of the pointing part.

The motion sensing unit 192Q may also sense such information as the shape of the user's face and a viewing direction of the user's face as well as the user's gesture.

Although not shown, the camera 200 may include a plurality of cameras. The plurality of cameras may be configured to operate as a stereo camera.

Figure 5:
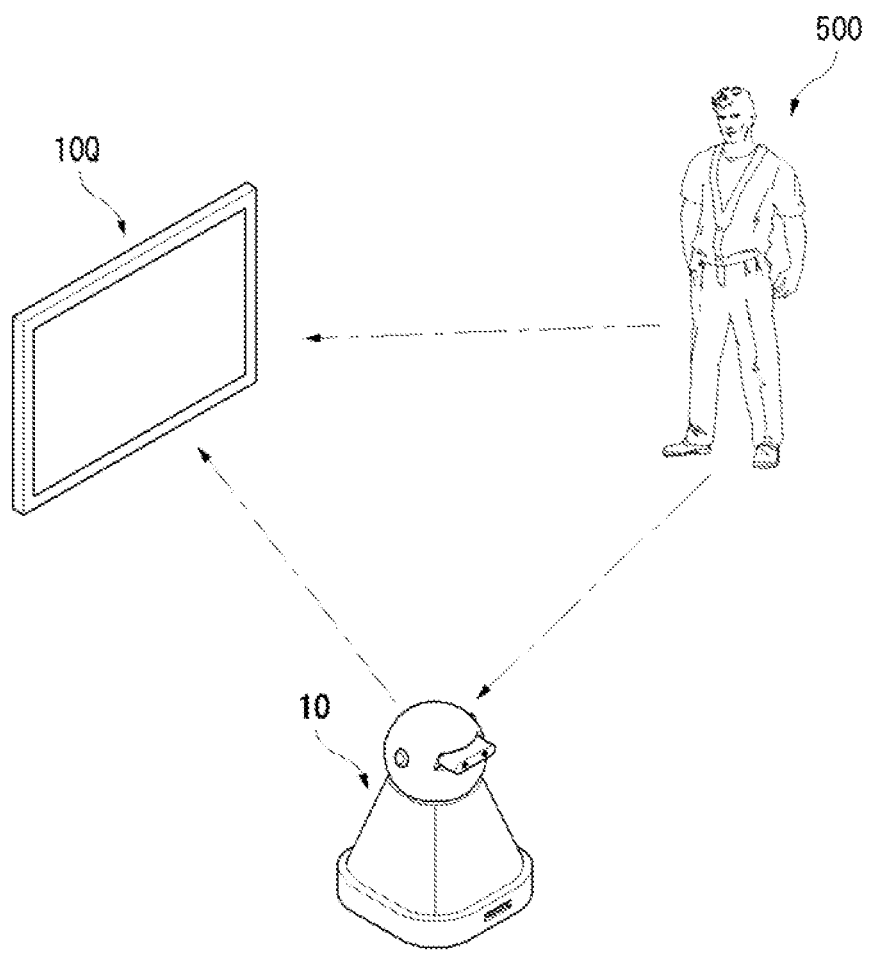

Referring to FIG. 5, a voice command and/or a gesture command a user 500 inputs may be input to the mobile input device 10. The mobile input device 10 may transmit a command signal corresponding to the voice command and/or the gesture command of the user 500 to the external electronic device, for example, the broadcasting signal receiver 10Q.

Figures 6, 7:
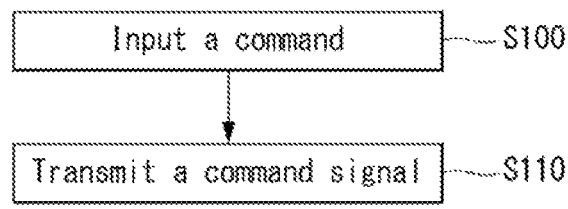

For example, as shown in FIG. 6, when the user 500 inputs a predetermined command using his or her voice or gesture in step S 100, the mobile input device 10 may recognize the command of the user 500 and transmit a command signal corresponding to the recognized command to the broadcasting signal receiver 10Q in step S110.

In the embodiment disclosed herein, the command signal may be a control signal for controlling the external electronic device, i.e., the broadcasting signal receiver 10Q.

The control signal may be used as a signal for performing various functions including power on/off, channel selection, screen setting, volume control, movement of a cursor or a pointer on the screen, menu selection, etc. in the broadcasting signal receiver 10Q.

FIG. 7 shows an example of a voice command and a function of the broadcasting signal receiver 10Q corresponding to the voice command.

For example, if the user says "loudly", the mobile input device 10 may recognize it as the voice command. More specifically, the voice recognition unit 111 of the mobile input device 10 may recognize the voice command "loudly" of the user.

The mobile input device 10 may transmit the command signal "turn up the volume" corresponding to the voice command "loudly" of the user to the broadcasting signal receiver 10Q.

Hence, the broadcasting signal receiver 10Q may turn up the volume in response to the command signal the mobile input device 10 transmits.

Figure 8:
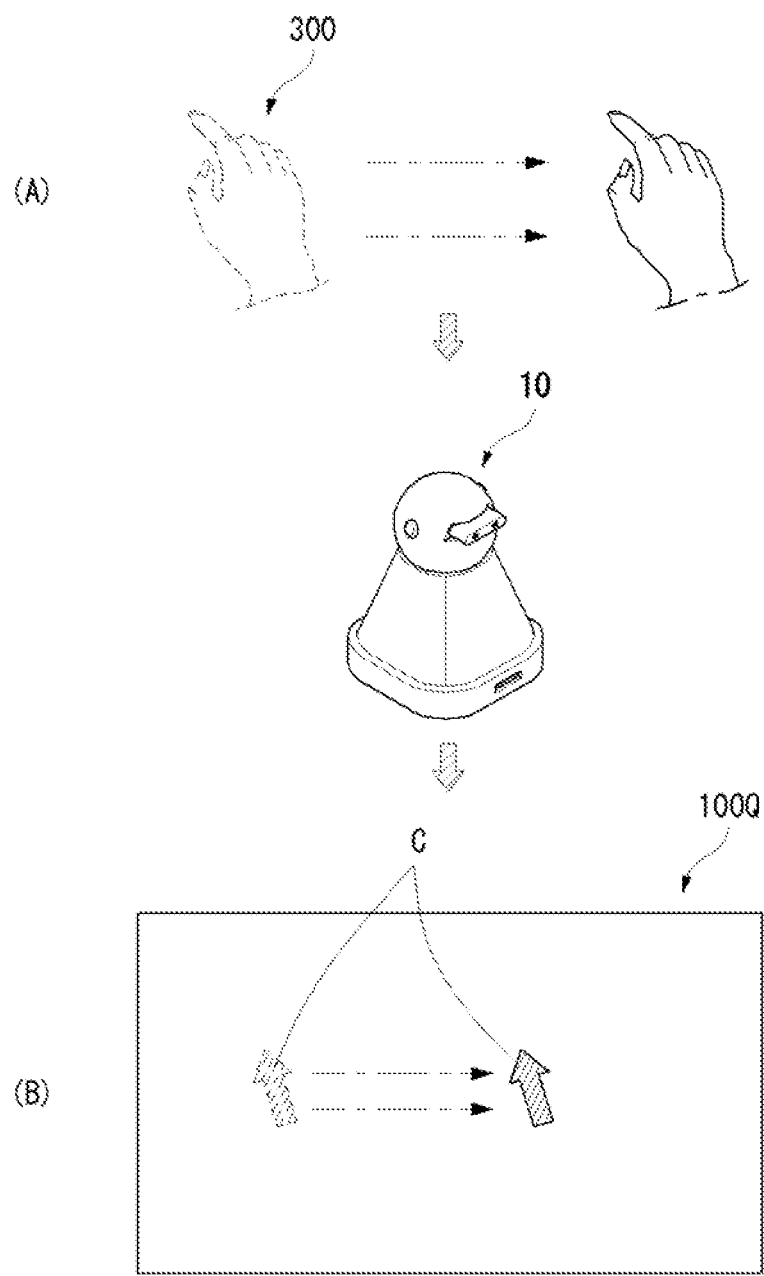
Figure 9:
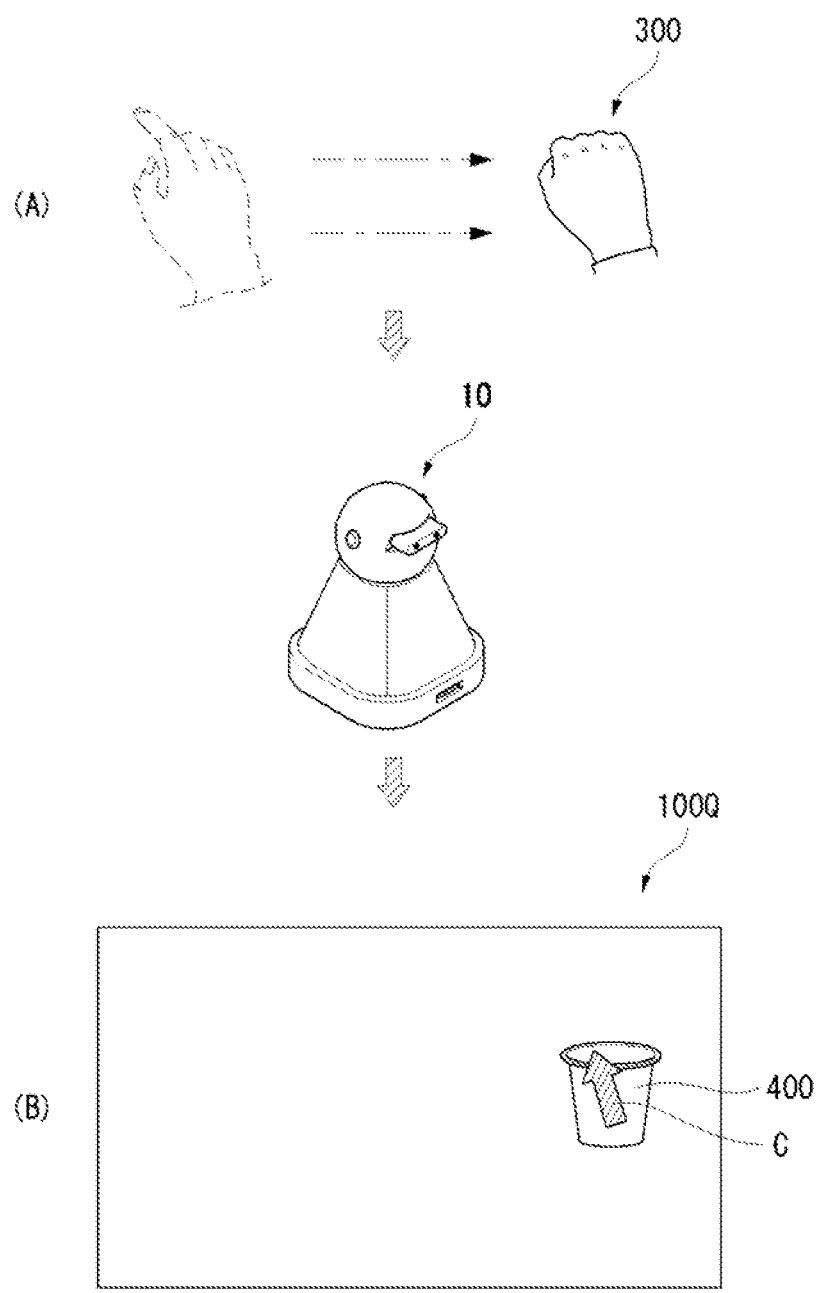

FIGS. 8 and 9 show an example of a gesture command and a function of the broadcasting signal receiver 10Q corresponding to the gesture command.

The gesture command may be regarded as being received when a previously set pointing part moves in accordance with a predetermined pattern. In what follows, the embodiment is described on the assumption that the pointing part is a user's hand 300.

As shown in (A) of FIG. 8, the user's hand 300 may move in a horizontal direction DRH, more particularly, from left to right.

The mobile input device 10 may recognize the movement of the user's hand 300. More specifically, the motion recognition unit 112 of the mobile input device 10 may recognize the movement of the user's hand 300.

The mobile input device 10 may transmit a command signal, which causes a pointer C to move to the right on the display unit 100Q, to the broadcasting signal receiver 10Q in accordance with the recognized movement of the user's hand 300, i.e., a gesture command.

As shown in (B) of FIG. 8, the broadcasting signal receiver 10Q may move the pointer C displayed on the display unit 100Q to the right in response to the command signal received from the mobile input device 10.

Alternatively, as shown in (A) of FIG. 9, the index finger of the user's hand 300 may be folded while the index finger is stretched.

The mobile input device 10 may recognize the movement of the index finger of the user's hand 300.

Further, the mobile input device 10 may transmit a command signal, which causes the pointer C to select an object 400 corresponding to the pointer C among objects displayed on the display unit 100Q, to the broadcasting signal receiver 10Q in accordance with the recognized movement of the index finger of the user's hand 300, i.e., a gesture command.

As shown in (B) of FIG. 9, the broadcasting signal receiver 10Q may select the object 400 corresponding to the pointer C among the objects displayed on the display unit 100Q in response to the command signal received from the mobile input device 10.

As described above, the mobile input device 10 may recognize the voice command and/or the gesture command and transmit the command signal corresponding to the recognized voice command and/or the recognized gesture command to the broadcasting signal receiver 10Q.

The voice command and/or the gesture command the user 500 inputs may be directly input to the broadcasting signal receiver 10Q without using the mobile input device 10.

Figure 10:
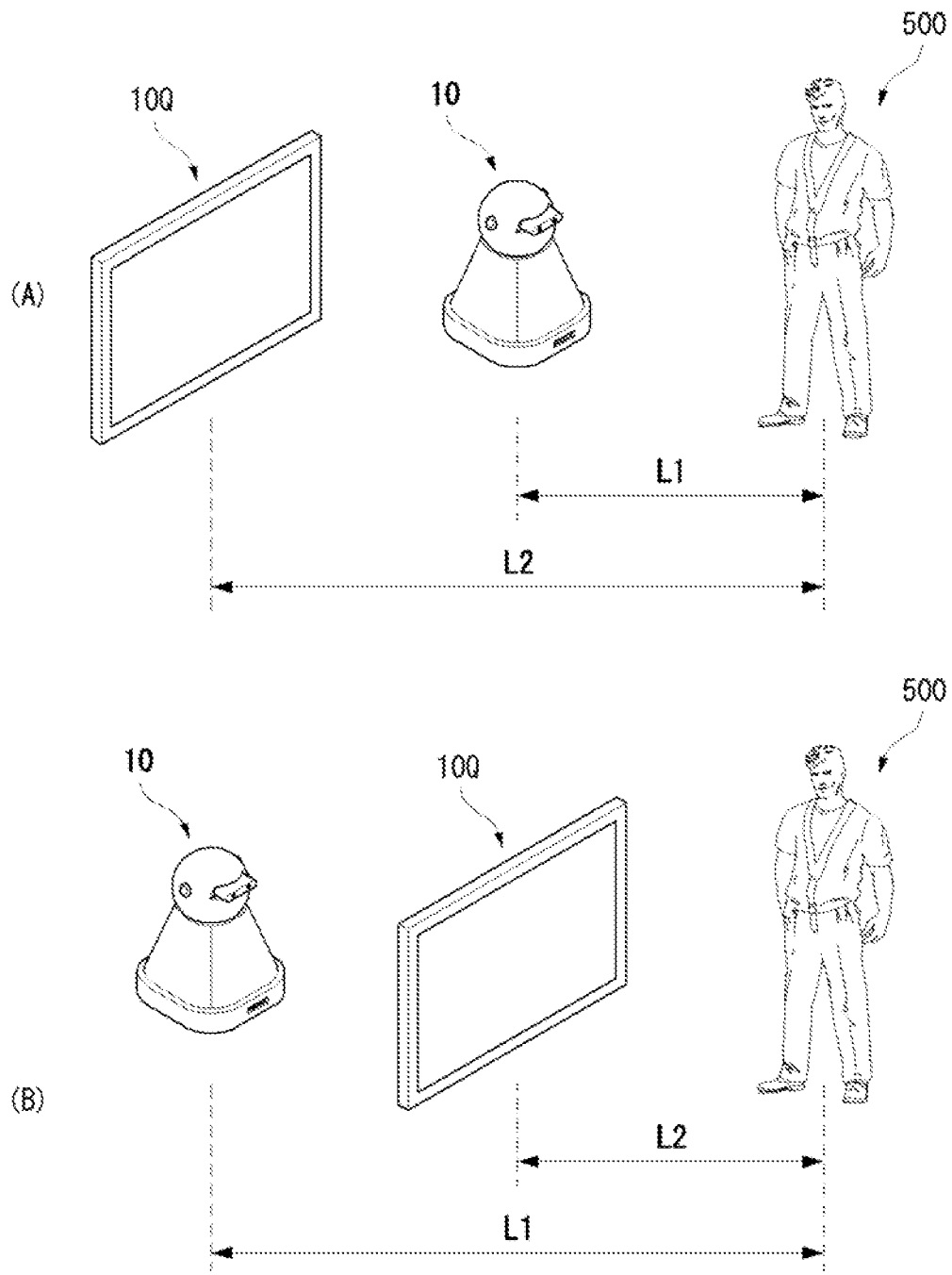

For example, as shown in (B) of FIG. 10, when a distance L2 between the user 500 and the external electronic device, i.e., the broadcasting signal receiver 10Q is less than a distance L1 between the user 500 and the mobile input device 10, the voice command and/or the gesture command the user 500 inputs may be directly input to the broadcasting signal receiver 10Q without using the mobile input device 10.

On the other hand, as shown in (A) of FIG. 10, when the distance L2 between the user 500 and the broadcasting signal receiver 10Q is greater than the distance L1 between the user 500 and the mobile input device 10, the mobile input device 10 may transmit a command signal corresponding to at least one of the voice and the gesture of the user 500 to the broadcasting signal receiver 10Q.

In other words, when the distance L1 between the user 500 and the mobile input device 10 is equal to or less than a previously set critical distance, the mobile input device 10 may transmit the command signal corresponding to at least one of the voice and the gesture of the user 500 to the broadcasting signal receiver 10Q.

Considering this, (B) of FIG. 10 shows an example where the distance L1 between the user 500 and the mobile input device 10 is greater than the previously set critical distance.

In the embodiment disclosed herein, the critical distance may be less than the distance L2 between the user 500 and the external electronic device, i.e., the broadcasting signal receiver 10Q.

The user 500 may use a call command, so as to more easily input the voice command and/or the gesture command to the mobile input device 10.

Figure 11:
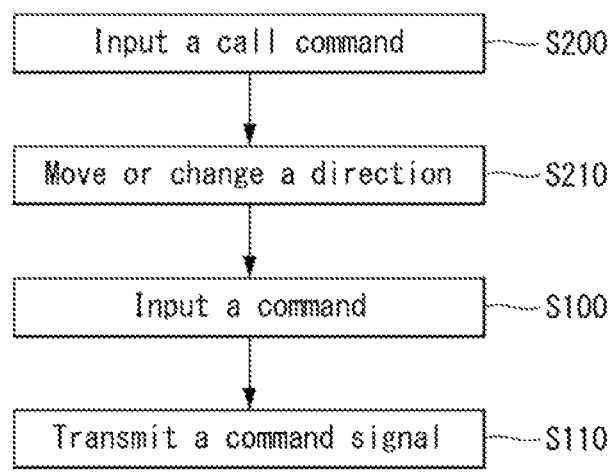

Referring to FIG. 11, when a call command is input in step S200, the mobile input device 10 may move and approach the user 500 or may change its direction to the user 500 in step S210.

Figure 12:
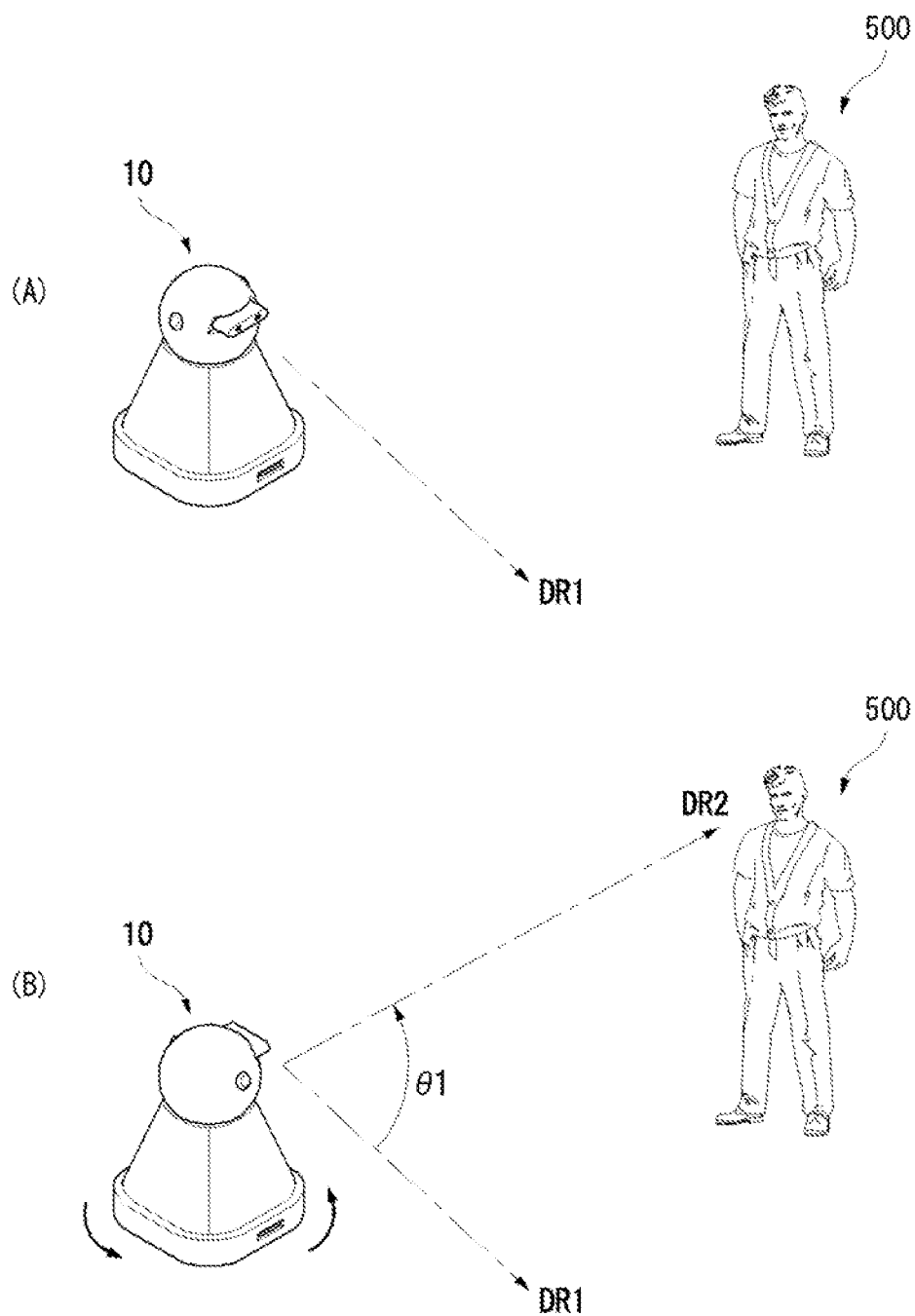

For example, suppose that the mobile input device 10 is positioned in a first direction DR1 as shown in (A) of FIG. 12. In this instance, the mobile input device 10 does not face the user 500.

As shown in (B) of FIG. 12, when the user 500 inputs a call command in a position state shown in (A) of FIG. 12, the mobile input device 10 may rotate by a first angle θ1 and change the direction to a second direction DR2 so that the mobile input device 10 faces the user 500.

A reason why the mobile input device 10 changes the direction as described above when the call command is input may be to more easily recognize the gesture of the user 500.

On the other hand, when the motion recognition unit 112 of the mobile input device 10 can recognize an area of 360°, the mobile input device 10 may not change the direction even if the user 500 inputs the call command.

Figures 13, 14:
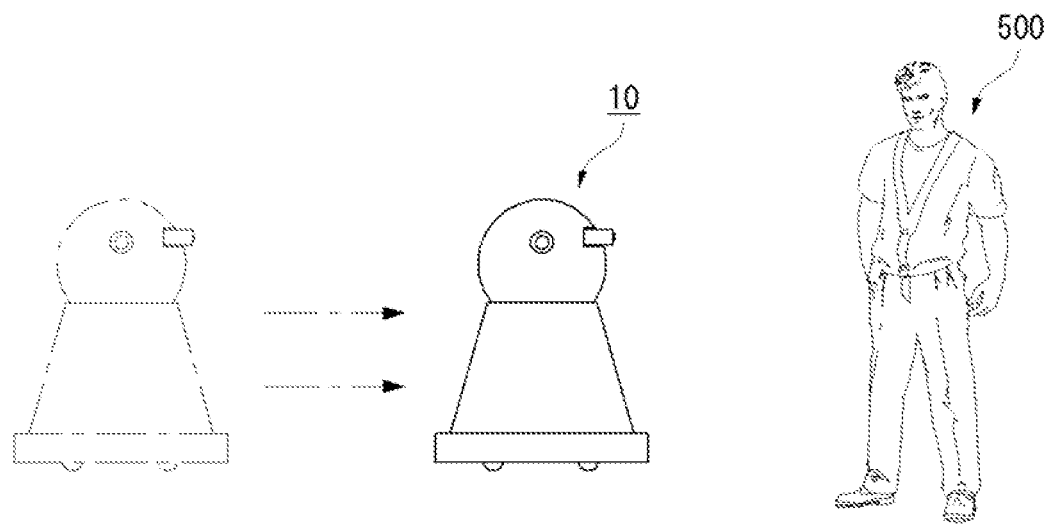

Alternatively, as shown in FIG. 13, when the user 500 inputs the call command, the mobile input device 10 may approach the user 500. Hence, a distance between the user 500 and the mobile input device 10 may decrease.

Afterwards, the mobile input device 10 may receive the voice command and/or the gesture command from the user 500 in a state where the mobile input device 10 approaches the user 500 or changes the direction to the user 500 in accordance with the call command in step S100.

In the embodiment disclosed herein, the call command may be at least one of the voice command and the gesture command.

Further, the call command may be set to specific words.

For example, as shown in FIG. 14, the call command may be "LG", and a release command may be "GL".

Alternatively, the call command may be "Start", and the release command may be "End".

Alternatively, the call command may be "Go", and the release command may be "Stop".

For example, when the user 500 says "LG", the mobile input device 10 may recognize it as the call command. Hence, the mobile input device 10 may approach the user 500 or change the direction to the user 500.

When the user 500 says "GL", the mobile input device 10 may recognize it as the release command. Hence, the mobile input device 10 may stop approaching the user 500 or changing the direction to the user 500.

Alternatively, the call command may be set to a specific frequency band.

For example, as shown in FIG. 15, a frequency band of the call command may be 10 Hz to 50 Hz, and a frequency band of the release command may be 500 Hz to 20 KHz.

In this instance, when the user 500 says a call word "Ah" at a frequency band of 10 Hz to 50 Hz, the call command may be input to the mobile input device 10. When the user 500 says the call word "Ah" at a frequency band of 500 Hz to 20 KHz, the release command may be input to the mobile input device 10.

As described above, the frequency band of the call command may be different from the frequency band of the release command.

Alternatively, the call command may be set to a specific accent.

For example, as shown in FIG. 16, the call command may be stressed on a first syllable of a call word, and the release command may be stressed on a last syllable of the call word.

In this instance, when the user 500 says a call word "hungry" stressed on the first syllable, the call command may be input to the mobile input device 10. When the user 500 says the call word "hungry" stressed on the last syllable, the release command may be input to the mobile input device 10.

As described above, an accent of the call command may be different from an accent of the release command.

Alternatively, the call command may be set to a specific gesture of the user.

A first gesture of the user 500 may be set to the call command, and a second gesture of the user 500 different from the first gesture may be set to the release command.

Figure 17:
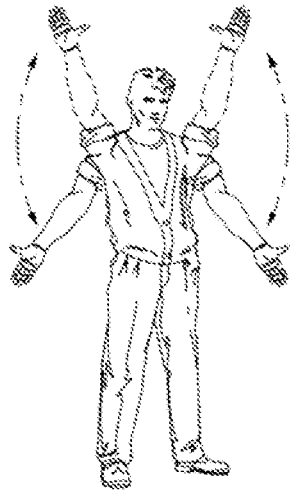
Figure 17:
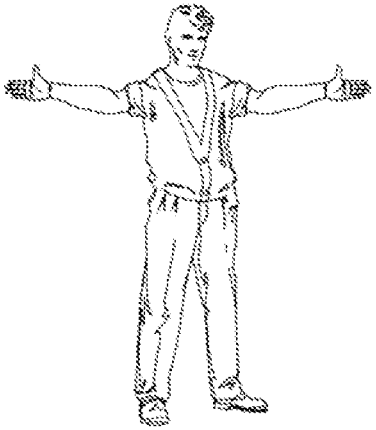

For example, as shown in FIG. 17, the user 500 moves his/her arms up and down, the call command may be input to the mobile input device 10. When the user 500 holds a pose with his/her arms open, the release command may be input to the mobile input device 10.

In the embodiment of the invention, the call command and/or the release command are not limited to the description given above and may be variously changed.

Figure 18:
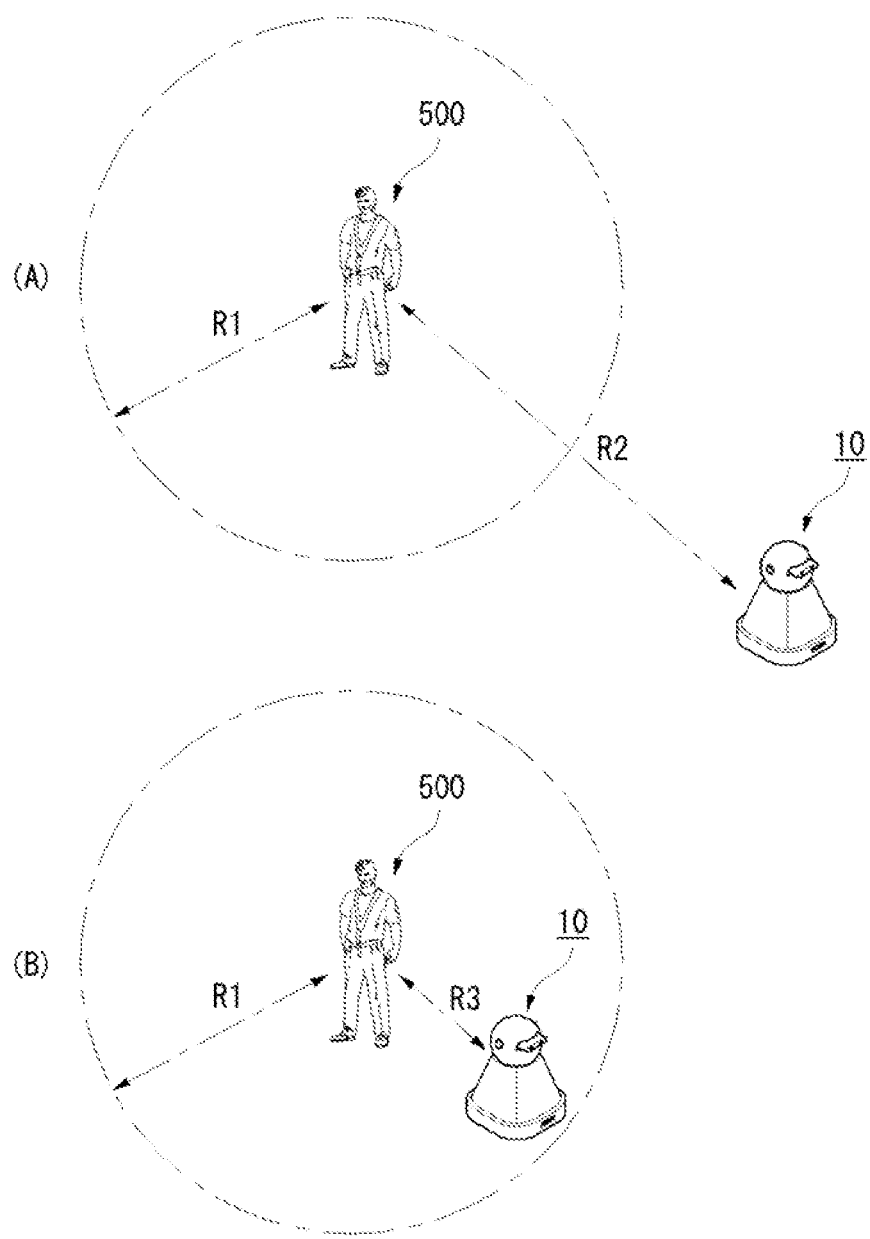

Referring to (A) of FIG. 18, when a distance R2 between the mobile input device 10 and the user 500 is greater than a previously set critical distance R1, the mobile input device 10 may approach the user 500 closer than the critical distance R1 if the call command is input.

Next, the mobile input device 10 may transmit the command signal corresponding to at least one of the voice command and the gesture command, which the user 500 positioned within the critical distance R1 inputs, to the external electronic device, for example, the broadcasting signal receiver 10Q.

When the mobile input device 10 approaches the user 500 or changes the direction to the user 500 in response to the call command as described above, the mobile input device 10 may more easily recognize the voice command and/or the gesture command of the user 500. Further, the precision of the recognition may be improved.

On the other hand, as shown in (B) of FIG. 18, when a distance R3 between the mobile input device 10 and the user 500 is less than the previously set critical distance R1, the mobile input device 10 may not approach the user 500 closer than the distance R3 even if the call command is input.

Namely, when the mobile input device 10 is separated from the user 500 by the critical distance RI or more, the mobile input device 10 may move to the user 500 in accordance with the call command input by the user 500. However, when the mobile input device 10 is separated from the user 500 within the critical distance R1, the mobile input device 10 may not move even if the user 500 inputs the call command.

Alternatively, as shown in (B) of FIG. 18, when the distance R3 between the mobile input device 10 and the user 500 is less than the previously set critical distance R1, the mobile input device 10 may change the direction to the user 500 if the call command is input to the mobile input device 10, which does not face the user 500.

For example, when the distance R2 between the mobile input device 10 and the user 500 is greater than the previously set critical distance R1 as shown in (A) of FIG. 18, the mobile input device 10 may approach the user 500 closer than the critical distance R1 while changing the direction to the user 500 if the call command is input to the mobile input device 10, which does not face the user 500 as shown in (A) of FIG. 12.

On the contrary, when the distance R3 between the mobile input device 10 and the user 500 is less than the previously set critical distance R1 as shown in (B) of FIG. 18, the mobile input device 10 may change the direction to the user 500 if the call command is input to the mobile input device 10, which does not face the user 500 as shown in (A) of FIG. 12. In this instance, because the mobile input device 10 does not move, the distance between the mobile input device 10 and the user 500 may not decrease.

Figure 19:
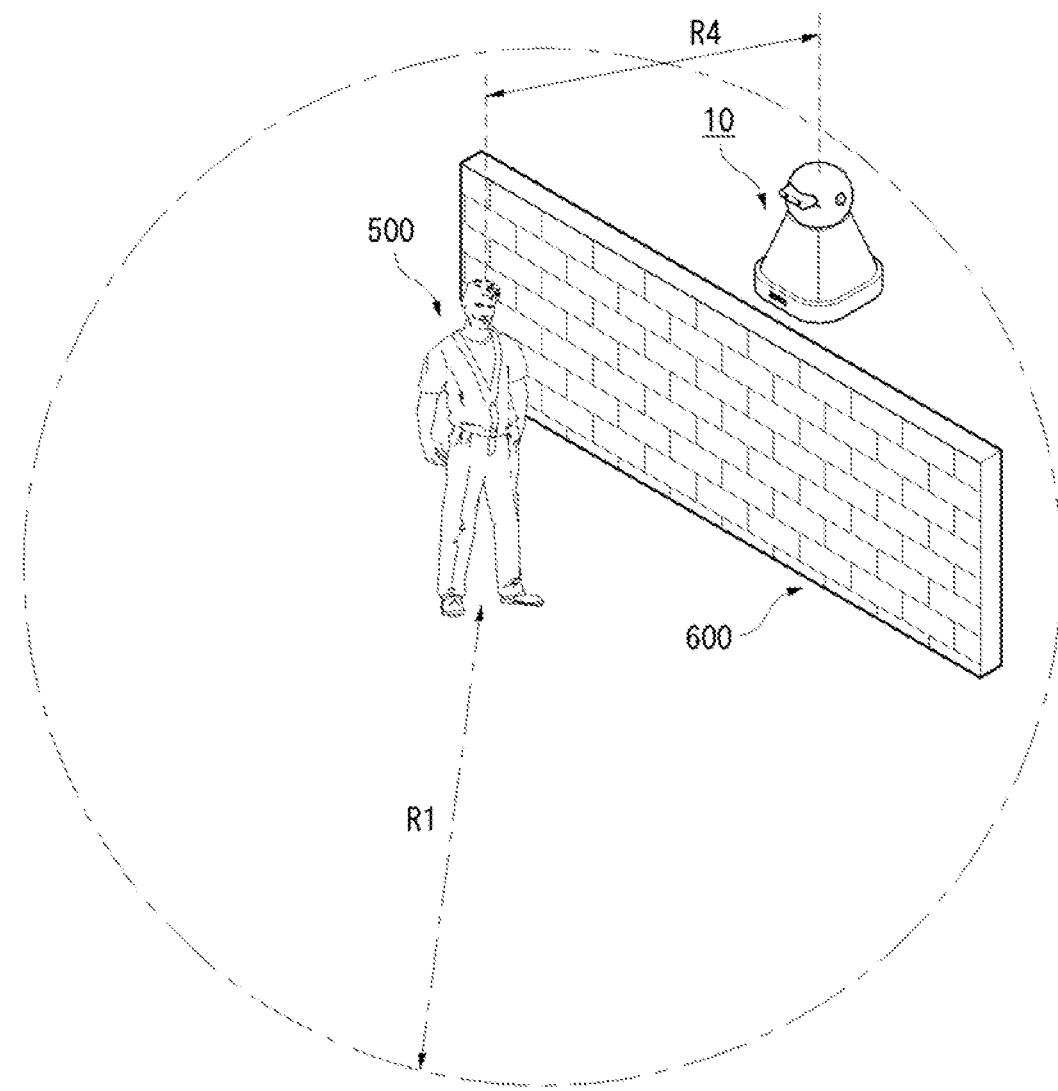

As shown in FIG. 19, it is assumed that a distance R4 between the user 500 and the mobile input device 10 is less than the previously set critical distance R1, and a barrier, for example, a wall 600 is positioned between the user 500 and the mobile input device 10. In this instance, when the call command is input, the mobile input device 10 may move.

For example, when the call command is input to the mobile input device 10, the mobile input device 10 may make a detour around the barrier 600 and approach the user 500. Or, the mobile input device 10 may improve the recognition sensitivity of the voice command and/or the gesture command of the user 500 by positioning the mobile input device 10 far away from the barrier 600.

In the embodiment disclosed herein, the barrier 600 may be something blocking a view of the motion recognition unit 112 of the mobile input device 10 so that the motion recognition unit 112 does not easily recognize the gesture of the user 500. Alternatively, the barrier 600 may be something which obstructs the voice recognition unit 111 of the mobile input device 10 from easily recognizing the voice command of the user 500.

An example where a plurality of users are positioned within the critical distance R1 from the mobile input device 10 is described below.

Figure 20:
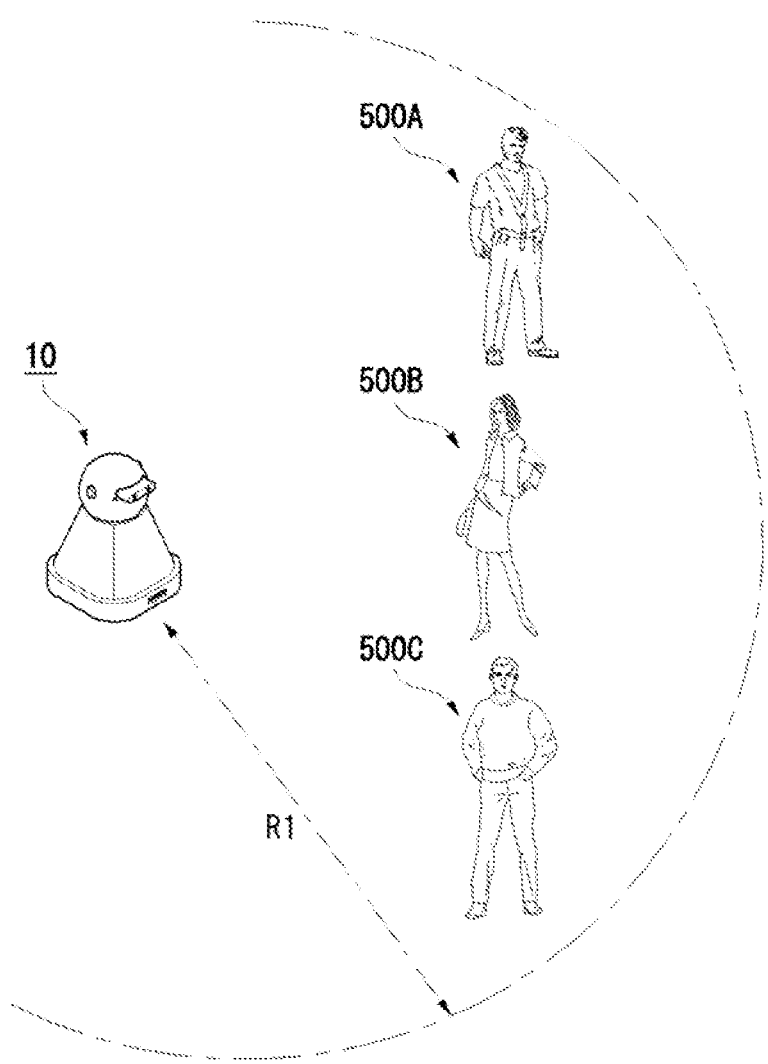

For example, as shown in FIG. 20, first, second, and third users 500A, 500B, and 500C may be positioned within the critical distance R1 from the mobile input device 10.

In this instance, the mobile input device 10 may give a control authority to the user corresponding to previously set facial recognition information among the first, second, and third users 500A, 500B, and 500C.

Figure 21:
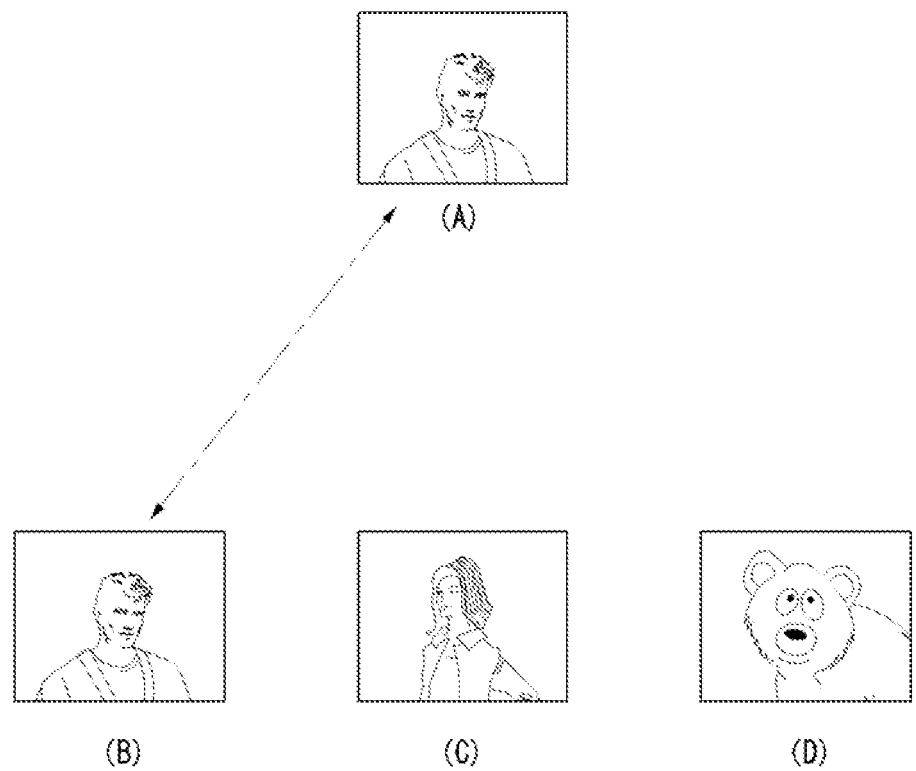

For example, referring to FIG. 21, facial information of (A) may be previously stored in the storage unit 140 of the mobile input device 10.

Further, the mobile input device 10 may individually recognize facial information (B) of the first user 500A, facial information (C) of the second user 500B, and facial information (D) of the third user 500C.

Afterwards, the mobile input device 10 may compare the previously stored facial information (A) with the facial informations (B), (C), and (D) of the first, second, and third users 500A, 500B, and 500C and recognize the user, for example, the first user 500A corresponding to the previously stored facial information (A).

In this instance, the mobile input device 10 may give the control authority to the first user 500A and transmit the command signal corresponding to the voice command and/or the gesture command, which the first user 500A inputs, to the external electronic device.

Alternatively, the mobile input device 10 may give a control authority to the user, who inputs a previously set password, among the first, second, and third users 500A, 500B, and 500C.

Figure 22:
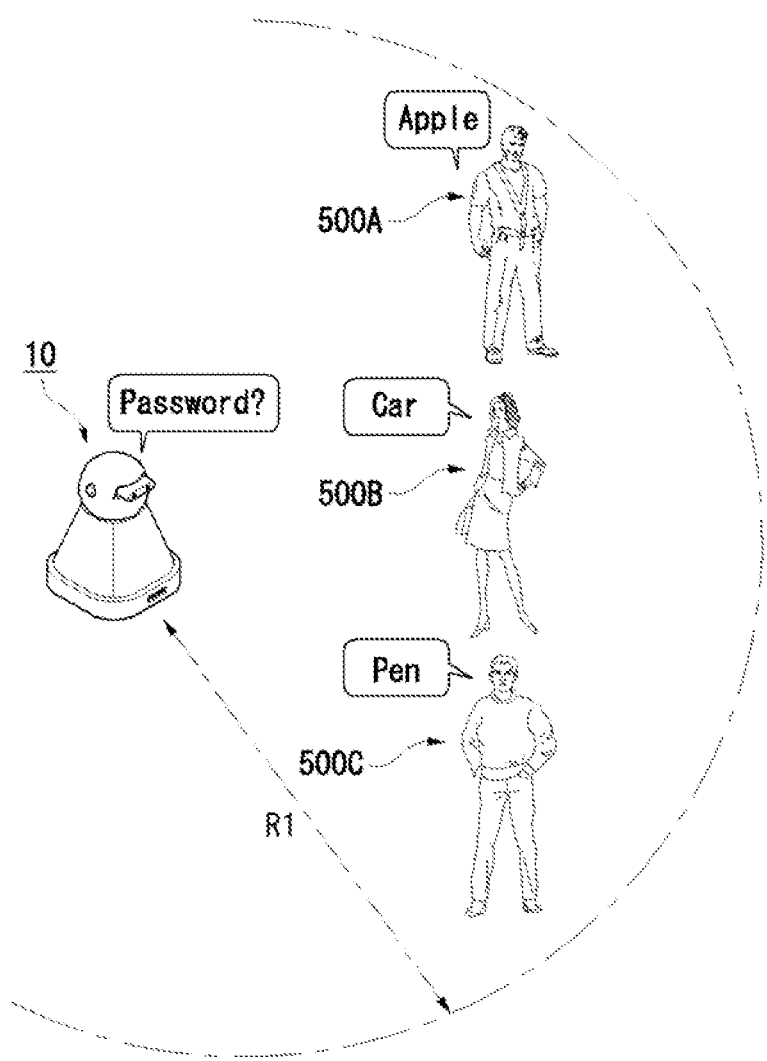

For example, as shown in FIG. 22, the mobile input device 10 may previously store a password "Apple" in the storage unit 140 of the mobile input device 10.

When a plurality of users, for example, the first, second, and third users 500A, 500B, and 500C are positioned within the critical distance R1 from the mobile input device 10, the mobile input device 10 may ask the password.

In this instance, if the first user 500A says "Apple", the second user 500B says "Car", and the third user 500C says "Pen", the mobile input device 10 may recognize the first user 500A as a proper user and give the control authority to the first user 500A.

Alternatively, the mobile input device 10 may give a control authority to the user, who makes a first response to a call of the mobile input device 10 among the first, second, and third users 500A, 500B, and 500C.

Figure 23:
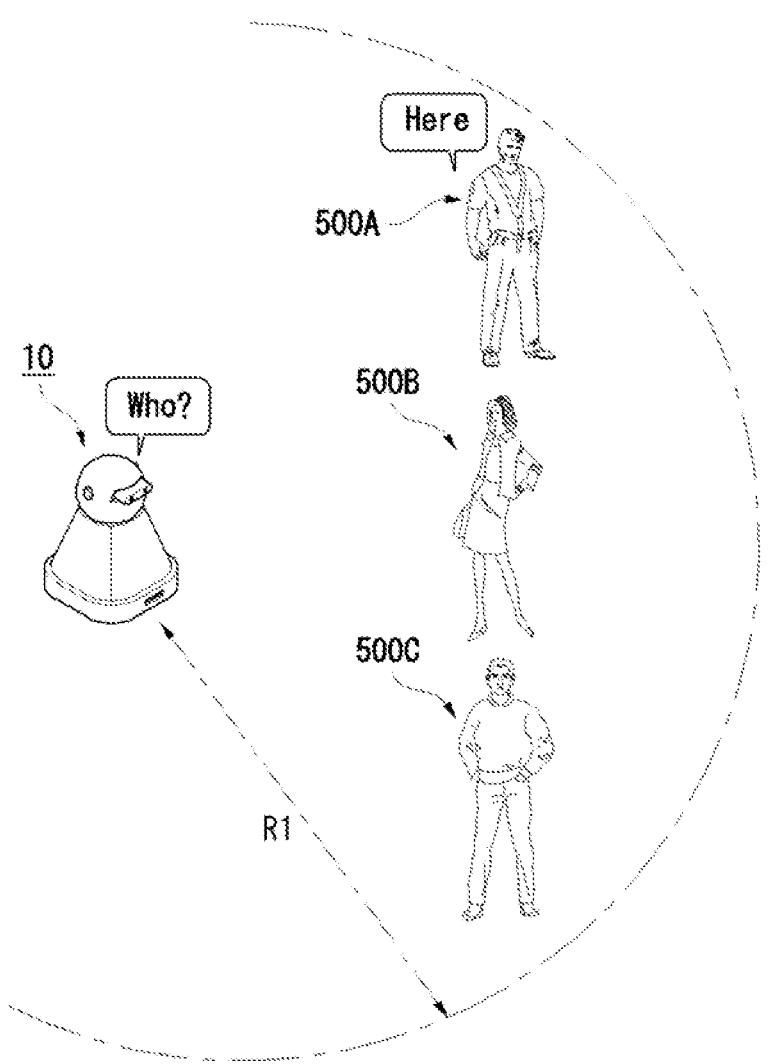

For example, as shown in FIG. 23, when a plurality of users, for example, the first, second, and third users 500A, 500B, and 500C are positioned within the critical distance R1 from the mobile input device 10, the mobile input device 10 may call the user ("Who?") inputting the call command.

If the first user 500A makes a first response ("Here") to a call of the mobile input device 10 among the first, second, and third users 500A, 500B, and 500C, the mobile input device 10 may give the control authority to the first user 500A.

In the embodiment disclosed herein, a response of the user to the call of the mobile input device 10 may be at least one of the voice and the gesture.

Namely, the user may respond to the call of the mobile input device 10 as the voice of, for example, "Here" or as the gesture to shake his/her arm, for example.

The plurality of users may input the call command to the mobile input device 10.

In this instance, a priority (weighting) may be given to previously determined users, so as to prevent a confusion generated when the control authority is given to the users.

For example, as shown in FIG. 25, it may be assumed that the previously determined users are a total of four people including a father, a mother, a son, and a daughter, a call command of the father is "LG", a call command of the mother is "Make money", a call command of the son is "Hungry", and a call command of the daughter is "Serve meal".

In this instance, the call commands of the plurality of users may be prioritized. For example, a first priority may be given to the call command "LG" of the father, a second priority may be given to the call command "Make money" of the mother, a third priority may be given to the call command "Hungry" of the son, and a fourth priority may be given to the call command "Serve meal" of the daughter.

If the plurality of users input their call commands to the mobile input device 10 together, the mobile input device 10 may perform a predetermined function corresponding to the call command having a high priority among the plurality of call commands.

Figure 24:
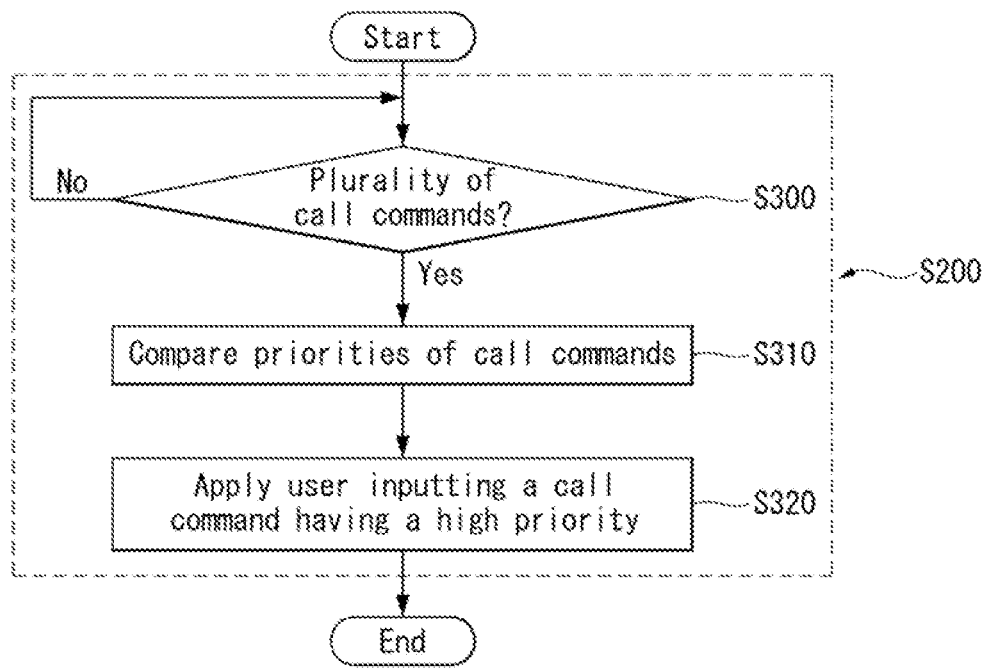

More specifically, as shown in FIG. 24, it is decided whether or not a plurality of call commands are input in step S300. When the plurality of call commands are input, priorities of the plurality of call commands may be compared in step S310.

Next, one call command having a high priority may be selected among the plurality of call commands as the result of a comparison, and the selected call command may be applied in step S320.

For example, when the call command "LG" of the father having the first priority and the call command "Hungry" of the son having the third priority are input together, the mobile input device 10 may approach the father in response to the call command "LG" of the father having the higher priority.

When the plurality of users are previously determined, the mobile input device 10 may store characteristic information corresponding to a call command of each user in the storage unit 140.

For example, the mobile input device 10 may store a call command of each user and a voice pattern, a frequency pattern, an accent pattern, etc. corresponding to the call command.

For example, as shown in FIG. 26, the mobile input device 10 may set a call command of the father among the users to "LG" and store the call command "LG" of the father and voice pattern information (a first voice pattern) of the father. Further, the mobile input device 10 may set a call command of the mother among the users to "Make money" and store the call command "Make money" of the mother and voice pattern information (a second voice pattern) of the mother.

In this instance, when the father among the users says the call command "LG" in the determined first voice pattern, the mobile input device 10 may recognize the father as the proper user. Hence, the mobile input device 10 may give the control authority to the father or approach the father.

On the other hand, when the father among the users says the call command "Make money" of the mother in the first voice pattern corresponding to the voice pattern of the father, the mobile input device 10 may recognize that the call command is erroneously input. Thus, the mobile input device 10 may not respond to the erroneously input call command.

In the embodiment disclosed herein, the voice pattern may analyze and obtain a voice of each user.

Although embodiments have been described with reference to a number of illustrative embodiments thereof, it should be understood that numerous other modifications and embodiments can be devised by those skilled in the art that will fall within the spirit and scope of the principles of this disclosure.

More particularly, various variations and modifications are possible in the component parts and/or arrangements of the subject combination arrangement within the scope of the disclosure, the drawings and the appended claims. Therefore, it should be defined by the appended claims or equivalents of the appended claims. In addition to variations and modifications in the component parts and/or arrangements, alternative uses will also be apparent to those skilled in the art.

The invention claimed is:

1. A mobile input device capable of moving using a driving motor, comprising:
    a moving unit including the driving motor; and
    a controller configured to:
    control recognition of a voice command and a gesture command, transmission of a command signal corresponding to the gesture command to a display device, and movement of the mobile input device, and
    recognize an index finger of a user's hand and transmit a command signal to cause a pointer displayed on the display device to select an object displayed on the display device in accordance with a recognized movement of the index finger,
    wherein when a plurality of call commands from different sources are input together, the controller is configured to:

compare predetermined priorities of the plurality of call commands, select a call command having a highest priority among the plurality of call commands, and when the selected call command matches the voice command, control the moving unit and move the mobile input device so that the mobile input device approaches the user saying the call command having the highest priority or change a direction of the mobile input device so that the mobile input device faces the user, wherein when a distance between the user and an external electronic device is greater than a distance between the user and the mobile input device, the controller is configured to transmit a command signal corresponding to the voice command and/or the gesture command of the user to the external electronic device, wherein when the distance between the user and the external electronic device is less than the distance between the user and the mobile input device, the controller is configured to not transmit the command signal to the external electronic device, and wherein the voice command and/or the gesture command the user inputs is directly input to the external electronic device without using the mobile input device.

2. The mobile input device of claim 1, wherein when the distance between the mobile input device and the user is greater than a previously set critical distance, the mobile input device is configured to approach the user closer than the critical distance when the call command is input.

3. The mobile input device of claim 2, wherein the mobile input device is configured to transmit the command signal corresponding to the voice command, which the user positioned within the critical distance inputs, to the external electronic device.

4. The mobile input device of claim 3, wherein when the user positioned within the critical distance is in the plural, the mobile input device is configured to give a control authority to the user corresponding to previously set facial recognition information among the plurality of users.

5. The mobile input device of claim 3, wherein when the user positioned within the critical distance is in the plural, the mobile input device is configured to give a control authority to the user inputting a previously set password among the plurality of users.

6. The mobile input device of claim 3, wherein when the user positioned within the critical distance is in the plural, the mobile input device is configured to give a control authority to the user, who makes a first response to a call of the mobile input device among the plurality of users.

7. The mobile input device of claim 6, wherein a response of the user to the call of the mobile input device is a gesture.

8. The mobile input device of claim 2, wherein the critical distance is less than the distance between the user and the external electronic device.

9. The mobile input device of claim 1, wherein the command signal is a control signal for controlling the external electronic device.

10. A command input method using a mobile input device capable of moving using a driving motor, comprising:

inputting a gesture command and a voice command to the mobile input device;

transmitting, via the mobile input device, a command signal corresponding to the gesture command to a display device; and recognizing, via the mobile input device, an index finger of a user's hand and transmitting a command signal to cause a pointer displayed on the display device to select an object displayed on the display device in accordance with a recognized movement of the index finger, wherein when a plurality of call commands from different sources are input together, the mobile input device is configured to:

compare predetermined priorities of the plurality of call commands, select a call command having a highest priority among the plurality of call commands, and when the selected call command matches the voice command, move and approach the user saying the call command having the highest priority or change a direction so that the mobile input device faces the user, wherein when a distance between the user and an external electronic device is greater than a distance between the user and the mobile input device, the controller is configured to transmit a command signal corresponding to the voice command and/or the gesture command of the user to the external electronic device, wherein when the distance between the user and the external electronic device is less than the distance between the user and the mobile input device, the controller is configured to not transmit the command signal to the external electronic device, and wherein the voice command and/or the gesture command the user inputs is directly input to the external electronic device without using the mobile input device.

11. The command input method of claim 10, wherein when the distance between the mobile input device and the user is greater than a previously set critical distance, the mobile input device is configured to approach the user closer than the critical distance when the call command is input.

12. The command input method of claim 11, wherein the mobile input device is configured to transmit the command signal corresponding to the voice command, which the user positioned within the critical distance inputs, to the external electronic device.

13. The command input method of claim 12, wherein when the user positioned within the critical distance is in the plural, the mobile input device is configured to give a control authority to the user corresponding to previously set facial recognition information among the plurality of users.

14. The command input method of claim 12, wherein when the user positioned within the critical distance is in the plural, the mobile input device is configured to give a control authority to the user inputting a previously set password among the plurality of users.

15. The command input method of claim 12, wherein when the user positioned within the critical distance is in the plural, the mobile input device is configured to give a control authority to the user, who makes a first response to a call of the mobile input device among the plurality of users.

16. The command input method of claim 11, wherein the critical distance is less than the distance between the user and the external electronic device.

* * * * *